United States Patent [19]
Lubbers et al.

[11] Patent Number: 5,826,001
[45] Date of Patent: Oct. 20, 1998

[54] RECONSTRUCTING DATA BLOCKS IN A RAID ARRAY DATA STORAGE SYSTEM HAVING STORAGE DEVICE METADATA AND RAID SET METADATA

[75] Inventors: Clark E. Lubbers, Colorado Springs; Stephen J. Sicola, Monument; Ronald H. McLean, Elbert; James Perry Jackson, Colorado Springs; Robert A. Ellis, Woodland Park, all of Colo.

[73] Assignee: Digital Equipment Corporation, Maynard, Mass.

[21] Appl. No.: 542,670

[22] Filed: Oct. 13, 1995

[51] Int. Cl.⁶ .......................... G06F 11/00; G06F 11/10; G06F 11/20

[52] U.S. Cl. .................. 395/182.04; 395/182.03; 395/182.04; 395/441

[58] Field of Search ................... 395/182.03, 182.04, 395/182.18, 404, 441, 438, 439; 371/37.7, 40.4, 51.1

[56] References Cited

U.S. PATENT DOCUMENTS

| | | | |
|---|---|---|---|
| 4,434,487 | 2/1984 | Rubinson et al. | 371/10 |
| 4,775,978 | 10/1988 | Hartness | 371/40.1 |
| 5,208,813 | 5/1993 | Stallmo | 395/182.05 |
| 5,233,618 | 8/1993 | Glider et al. | 371/68.1 |
| 5,235,601 | 8/1993 | Stallmo et al. | 371/40.1 |
| 5,253,256 | 10/1993 | Oyama et al. | 371/40.1 |
| 5,301,297 | 4/1994 | Menon et al. | 395/441 |
| 5,331,646 | 7/1994 | Krueger et al. | 395/182.04 |
| 5,379,411 | 1/1995 | Morgan et al. | 395/182.04 |
| 5,390,187 | 2/1995 | Stallmo | 395/441 |
| 5,390,327 | 2/1995 | Lubbers et al. | 395/182.05 |
| 5,469,453 | 11/1995 | Glider et al. | 371/68.1 |
| 5,488,701 | 1/1996 | Brady et al. | 395/182.04 |
| 5,490,248 | 2/1996 | Dan et al. | 395/182.04 |
| 5,504,858 | 4/1996 | Ellis et al. | 395/182.04 |
| 5,522,031 | 5/1996 | Ellis et al. | 395/182.04 |
| 5,522,032 | 5/1996 | Franaszek et al. | 395/182.04 |

Primary Examiner—Robert W. Beausoliel, Jr.
Assistant Examiner—Luan C. Do
Attorney, Agent, or Firm—Michael A. Rodriguez; Ronald C. Hudgens

[57] ABSTRACT

A data block in a RAID array is reconstructed under the control of metadata recorded on the RAID array. The RAID array has a plurality of members, each member being a data storage device. The metadata includes device metadata for data blocks recorded on each member and RAIDset metadata for RAID protected data blocks recorded across the members of the RAID array. The RAID protected data blocks include user data blocks, RAIDset metadata blocks and parity data blocks. The data blocks are reconstructed by detecting from a device FE bit in the device metadata that a bad data block corresponding to or associated with the device FE bit needs to be reconstructed. The data is read from each data block, other than the bad data block, in the same RAID sliver with bad data block. A RAID sliver of data blocks includes all the data blocks in a RAID protected sliver of data blocks. From the data read from the other data blocks in the RAID sliver with the bad data block, the bad data block is regenerated to produce a new data block. The new data block is written in the RAID array as the reconstructed block in place of the bad data block. The device FE bit for the reconstructed data block is cleared to indicate the reconstructed data block is consistent with the other data blocks in the RAID protected sliver containing the reconstructed data block.

10 Claims, 9 Drawing Sheets

RECONSTRUCTING DATA BLOCKS IN A RAID ARRAY DATA STORAGE SYSTEM HAVING STORAGE DEVICE METADATA AND RAID SET METADATA

BACKGROUND OF THE INVENTION

1. Field of the Invention.

This invention relates to a RAID array, data storage system having a storage format that includes device metadata on each storage device in the array and RAID protected RAIDset metadata distributed across the storage devices in the RAID array. More particularly, the invention relates to reconstructing data blocks in slivers of the RAID array through use of the RAIDset metadata and device metadata.

2. Description of Related Art.

In data processing systems, there has been and continues to be an ongoing evolution in increasing the reliability of user data stored on data storage subsystems used by the data processing system. For some time, Digital Equipment Corporation has provided on each of the SCSI disk drives in its storage subsystems a flag bit for each block of data recorded on the disk drive. This flag bit is named the forced error bit or FE bit. Each user data block on the drive has a corresponding FE bit stored on the disk drive. If the FE bit is set to one, it indicates the user data in the block associated with the FE bit is not trustworthy. In other words, the data can be read but, for whatever reason, the data is corrupt and can not be trusted. U.S. Pat. No. 4,434,487 illustrates generation and use of the FE bit.

Another technique for adding to the reliability of stored user data is the distribution of user data across multiple storage devices in a RAID array of storage devices. The purpose of a RAID array is to provide redundancy so that user data may be regenerated when individual blocks of data are bad or lost. For example, in a RAID array having five storage devices or members, user data is recorded in four blocks, each of these four blocks is recorded on a separate storage device, i.e. disk drive. In addition, a fifth drive or member is added to the RAID array in order to store a parity block for the other four blocks. The four user data blocks and their parity block are said to form a sliver in the RAID array. A complete description of the RAID disk array technology may be found in *The RAID Book, a Source Book for Disk Array Technology*, Fourth Edition, edited by Paul Massiglia and published by the RAID Advisory Board, St. Peter, Minn., Sep. 1, 1994, copyright 1994 RAID Advisory Board, Incorporated.

The parity block in a sliver of blocks is created by exclusive ORing the user data blocks in the sliver. The nth bit of the parity block is the exclusive OR (XOR) of the nth bit of each data block in the sliver. If any one of the user data blocks or the parity block is bad, the bad block may be reconstructed by bitwise XORing the remaining blocks in the sliver. When the parity block contains the bitwise XOR of the data blocks in the sliver, the sliver is said to be consistent. Consistency in a RAID array is typically tracked by initializing the RAID array with consistent data. Read errors then imply inconsistency. When introducing a replacement member, the progress of the reconstruction is stored in the controller.

To date, there has been no way to save the fact that certain blocks are untrustworthy because they could not be reconstructed.

SUMMARY OF THE INVENTION

It is an object of this invention to reconstruct data blocks and recover consistency across a sliver in the RAID array.

In accordance with this invention, a data block in a RAID array is reconstructed under the control of metadata recorded on the RAID array. The RAID array has a plurality of members, each member being a data storage device. The metadata includes device metadata for data blocks recorded on each member and RAIDset metadata for RAID protected data blocks recorded across the members of the RAID array. The RAID protected data blocks include user data blocks, RAIDset metadata blocks and parity data blocks. The data blocks are reconstructed by detecting from a device FE bit in the device metadata that a bad data block corresponding to, or associated with, the device FE bit needs to be reconstructed. The data is read from each data block, other than the bad data block, in the same RAID sliver with the bad data block. A RAID sliver of data blocks includes all the data blocks in a RAID protected sliver of data blocks. From the data read from the other data blocks in the RAID sliver with the bad data block, the bad data block is regenerated to produce a new data block. The new data block is written in the RAID array as the reconstructed block in place of the bad data block. The device FE bit for the reconstructed data block is cleared to indicate the reconstructed data block is consistent with the other data blocks in the RAID protected sliver containing the reconstructed data block.

The foregoing and other objects, features and advantages of the invention will be apparent from the following more particular description of preferred embodiments of the invention as illustrated in the accompanying drawings.

DETAILED DESCRIPTION

Figure 1:
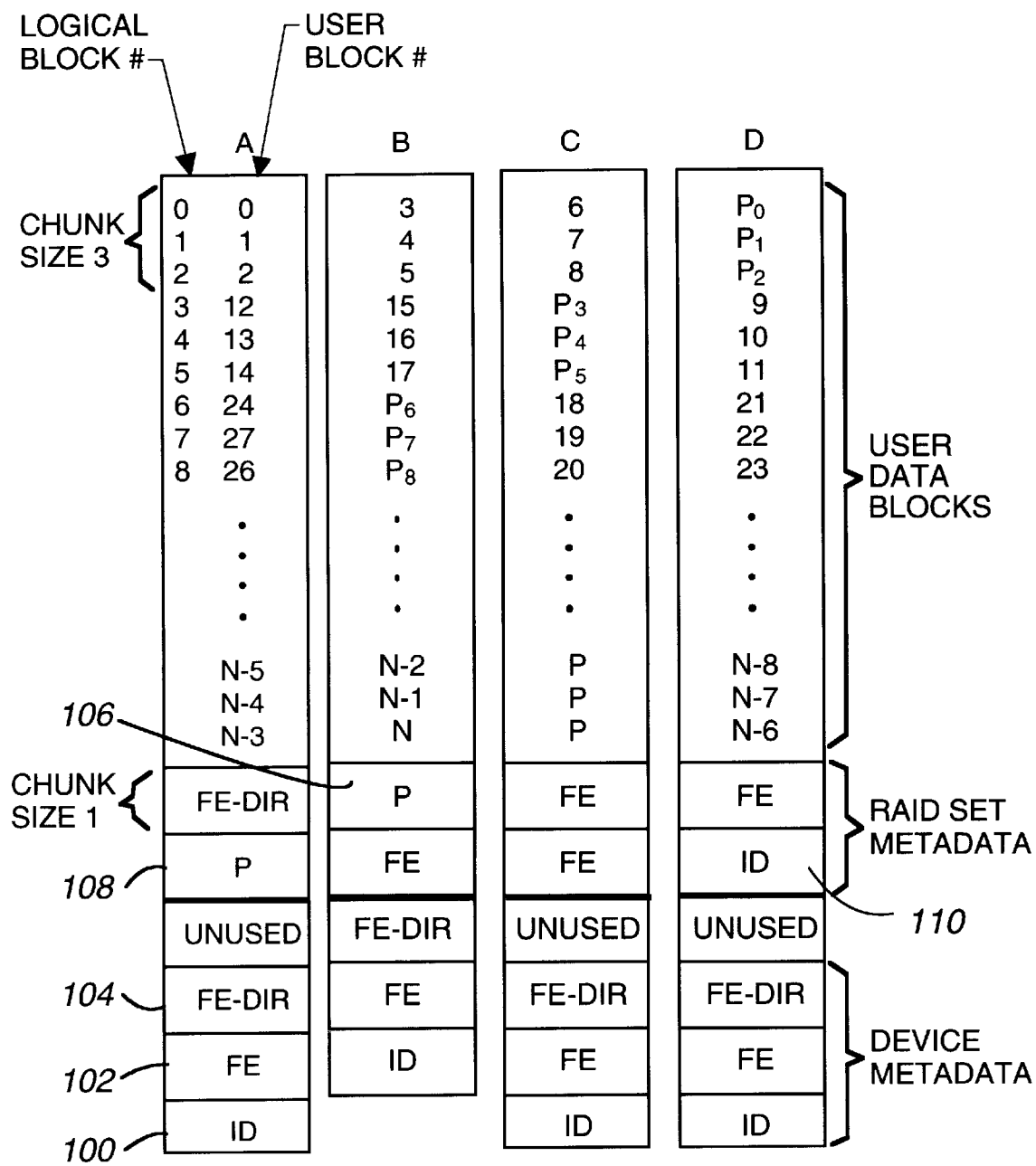
FIG. 1 shows a four disk RAID array with RAIDset metadata and device metadata.

In FIG. 1, the physical locations of RAIDed (or RAID protected) user data, RAIDed metadata and device metadata are illustrated in accordance with a preferred embodiment of the invention. In the simple example of FIG. 1, the RAID array includes four disk drives, drives A, B, C, and D. As indicated in FIG. 1, the storage capacity of the drives is split between user data blocks, RAIDset metadata, and device metadata.

Drives A, B, C, and D need not be of the same size. If they are not the same size as depicted in FIG. 1, there is unused storage space in the larger drives. This unused space is located between the highest numbered block of the RAIDset metadata and the lowest numbered block of the device metadata.

Both the user data blocks and the RAIDset metadata are RAID protected data. As indicated for the user data blocks, three data blocks, one from each of the disk drives is associated with a parity block in the fourth disk drive. The parity block is written based on the exclusive OR summation of its associated user data blocks. For example, parity block P1 is the result of exclusive ORing user block 1, user block 4 and user block 7. In Boolean notation, this is represented by P1=1⊕4⊕7.

The user data blocks are accessed in chunk sizes of three blocks. For example, user blocks 12, 13 and 14 are read from disk drive A, while user blocks 15, 16, and 17 are read from drive B and blocks 9, 10, and 11 are read from drive D. At the same time, parity blocks P3, P4, and P5 are read from drive C. User blocks 9, 12 and 15 with parity block P3 constitute a sliver and are said to be RAID protected or RAIDed.

With regard to the metadata, the device metadata is recorded in the last few logical blocks of each device, i.e. disk drive. The last block in the device metadata is the ID block. In drive A, for example, the device metadata identifies the disk drive, the RAID array, the disk drive members of the RAID array (in this case drives A, B, C, and D) and other operative information regarding the disk drive A. In the data space just preceding the ID block in drive A, device FE bits for the logical blocks in drive A are written.

Logical blocks are numbered by disk drive. In drive A, the user data blocks are 0, 1, 2, 12, 13, 14, 24, 25, 26, etc. The same blocks as logical blocks in drive A are numbered 0–8. Accordingly, user data block 14 in drive A would be logical block 5 in drive A. Similarly, although not indicated in FIG. 1, user data block 17 in drive B would correspond to logical block 5 in drive B.

The device FE bits recorded in space 102 of drive A indicate the useability of logical blocks in drive A to reconstruct data in a bad block in the same RAIDed sliver. In other words, each device FE bit indicates the consistency of its corresponding data block relative to other data blocks in the same sliver of the RAID array. If a device FE bit is set to "1," the corresponding logical block data is said to be non-redundant or inconsistent. This means that data in the block cannot be used with the other blocks of data in the RAID sliver to reconstruct data in one of the other blocks. If the device FE bit is "0," the corresponding logical block is said to be clear. In this case, the data in the logical block may be used to reconstruct data in other blocks in the same RAID sliver. For example, if the device FE bit for logical block 5 in drive A is set to 1, the user data in user block 14 is not redundant or is inconsistent. The user data in block 14 cannot be used to reconstruct data in user blocks 11 or 17 or parity block P5. If the device FE bit for logical block 5 is 0, then the data in logical block 5 or user block 14 is consistent and may be used to reconstruct data in one of the blocks 11, 17 or P5.

The device FE Dir bits in space 104 of drive A are used to provide a fast lookup of the condition of the FE bits in space 102. There is one FE Dir bit in space 104 for each block of FE bits in space 102. An FE Dir bit is set to 1 if any FE bit in its corresponding block in the FE space 102 is set to 1. Accordingly, an FE Dir bit set to 0 indicates that all FE bits in its FE bit block are clear. Conversely, if an FE Dir bit is set to 1, at least one of the FE bits in the corresponding FE bit block is set to 1.

Each of the disk drives B, C, and D contain corresponding information for their drive in corresponding ID blocks, device FE bit space and device FE Dir bit space. This data is referred to as the device metadata.

The RAIDset metadata provides information about the RAIDed, or RAID protected, user data blocks in the entire virtual set of user data blocks. It is not limited to each drive as was the device metadata described immediately above. Virtual set refers to the user data blocks (but not the parity blocks) distributed across the drives A–D in the RAID array. In other words, in the example in FIG. 1, the virtual set consists of user data blocks 0–N. To a host CPU using the RAID array a virtual set looks like a virtual disk drive having 0–N data blocks.

The RAIDset metadata adds to this virtual drive the same metadata structure as used for the device metadata in the actual drives. In other words, the RAIDset metadata includes an ID block for the virtual set of data blocks, multiple blocks of FE bits, and an FE Dir block. Further, the RAIDset metadata is included in the RAID protected region of the disk drives, and therefore parity blocks 106 and 108 are provided for RAID protection of the RAIDset metadata. The ID block 110 identifies the virtual set of blocks and the members (disk drives) of the RAIDset. The FE bit space contains an FE bit for each user block in the virtual set. Each FE bit is set to 1 to indicate that its corresponding user block contains data that is not trustworthy. In other words, if the FE bit for user block 25 is set to 1, then user block 25 in disk drive A may be read, but the data is corrupted and may not be trusted. If the FE bit in the RAIDset metadata is set to 0, then the corresponding user block contains true, or valid, data, i.e., data that may be trusted.

Just as with device metadata, the RAIDset metadata also has one or more FE Dir blocks. In the FE Dir block, each bit corresponds to a block of FE bits in the FE bit space. The FE Dir bit is set to 1 to indicate that its corresponding FE bit block has at least one bit set to 1. If the FE Dir bit in the RAIDset metadata is set to 0, then the corresponding FE bit block in the RAIDset metadata contains all zeros.

Figure 2:
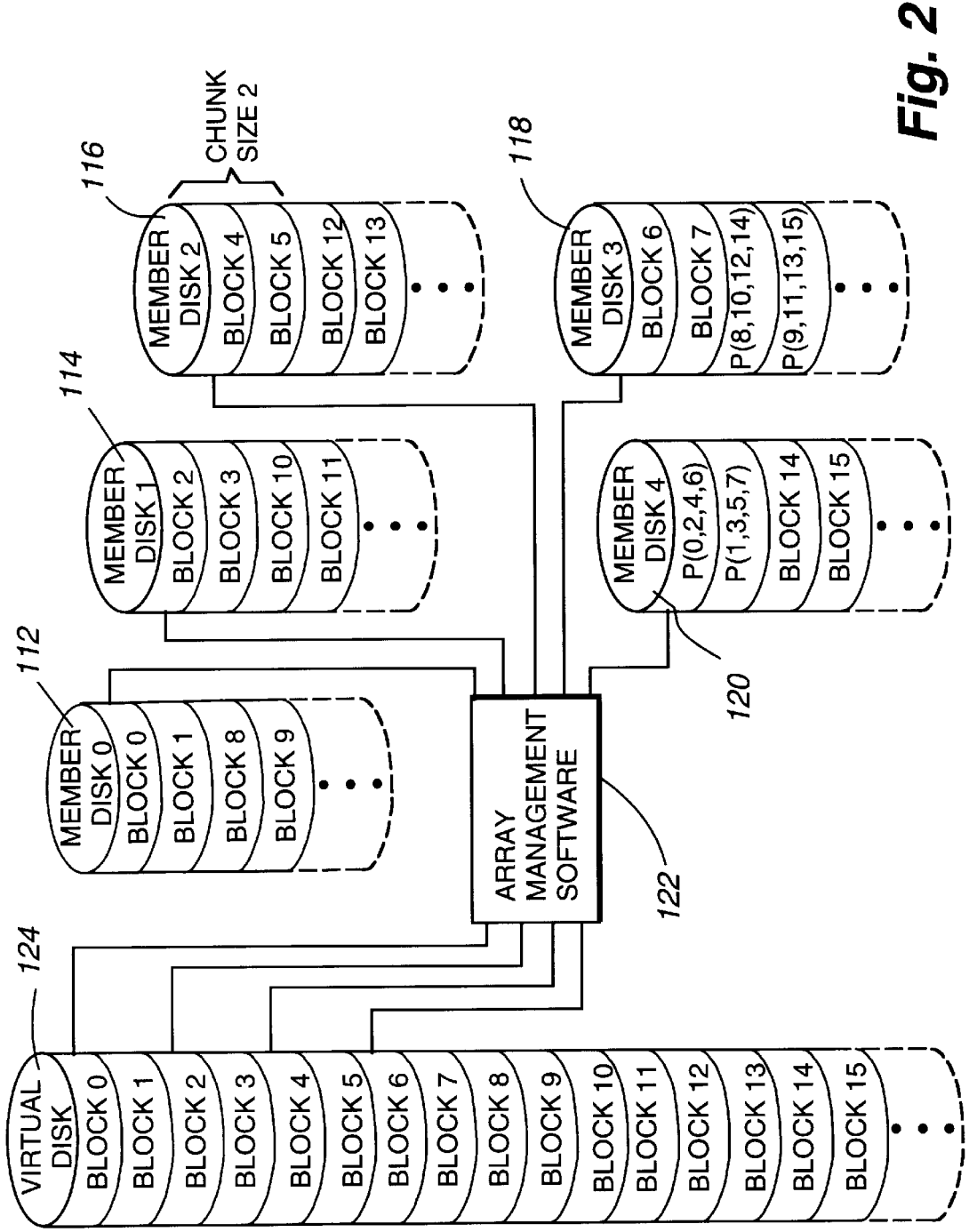
FIG. 2 illustrates the relationship between actual disk drives of a RAID array, RAID array management software and the virtual disk drive simulated by the RAID array.

In FIG. 2, a RAID level 5 relationship between actual member disk drives and the equivalent virtual disk drive is illustrated. There are five actual disk drives: 112, 114, 116, 118 and 120. The RAID array management software 122 manages the distributed user data blocks and parity blocks on drives 112, 114, 116, 118 and 120 so that as a virtual set the user data blocks appear as illustrated on virtual disk drive 124. The RAID system in FIG. 2 differs from that depicted in FIG. 1 in that there are five actual disk drives in FIG. 2, while there are four in FIG. 1. Also, the chunk size for the user data blocks is 3 blocks high in FIG. 1, while it is 2 blocks high in FIG. 2. The device metadata and RAIDset metadata are not shown in FIG. 2.

Figure 3:
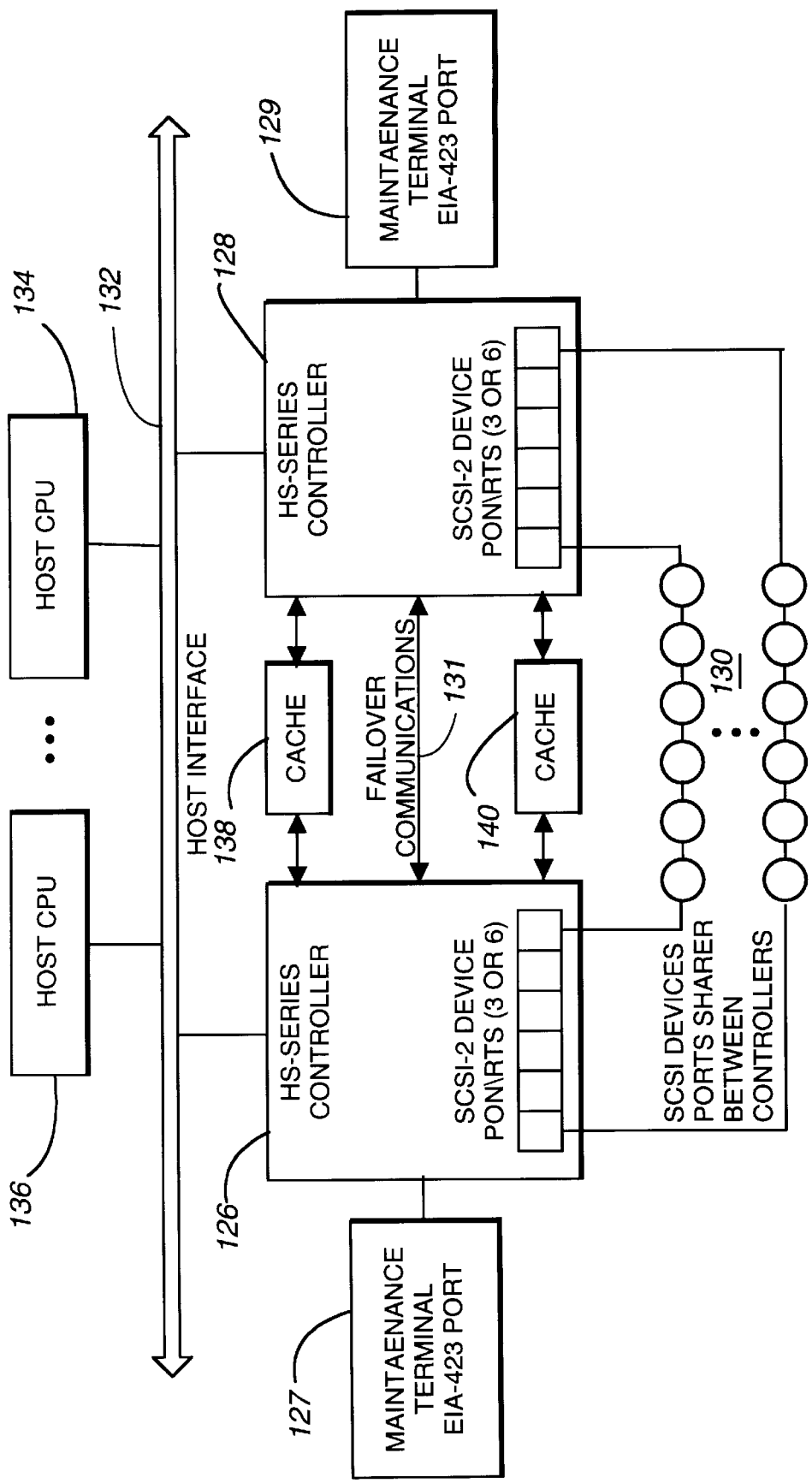
FIG. 3 illustrates a data processing system having redundant RAID array controllers for running RAID array management software for reconstructing data blocks in accordance with this invention.

The array management software runs on the controllers in the data processing system shown in FIG. 3. FIG. 3 illustrates a redundant controller RAID system connected to a host interface with a plurality of host CPUs. Array controller 126 and array controller 128 each are connected to up to six SCSI device busses 130. The members (disk drives) of the RAID array are connected to the busses. The controllers also connect to the host interface 132 and thereby to host CPUs 134 and 136. Controllers 126 and 128 also share cache memory 138 and 140.

Controllers 126 and 128 each include a processor with program storage and working storage for effectively creating the appearance of a virtual disk such as 124 in FIG. 2 from the actual disk drives connected to ports 130. The array management is transparent to host CPU 134 and host CPU 136. As to these host CPUs, it appears as if they have access to a virtual disk drive such as disk drive 124 in FIG. 2. The maintenance terminal ports 127 and 129 provide programmable and test access to the processors in the controllers 126 and 128 respectively. The failover communication link 131 provides communication for handoff control to one controller when the other controller fails. A more detailed discussion of RAID array controllers appears in the article entitled "The Architecture and Design of HS-Series Storage Works Array Controllers" by Stephen J. Sicola in the Digital Technical Journal, Vol. 6, No. 4, published by Digital Equipment Corporation. This article describing array controllers is incorporated by reference into this application.

Figure 4:
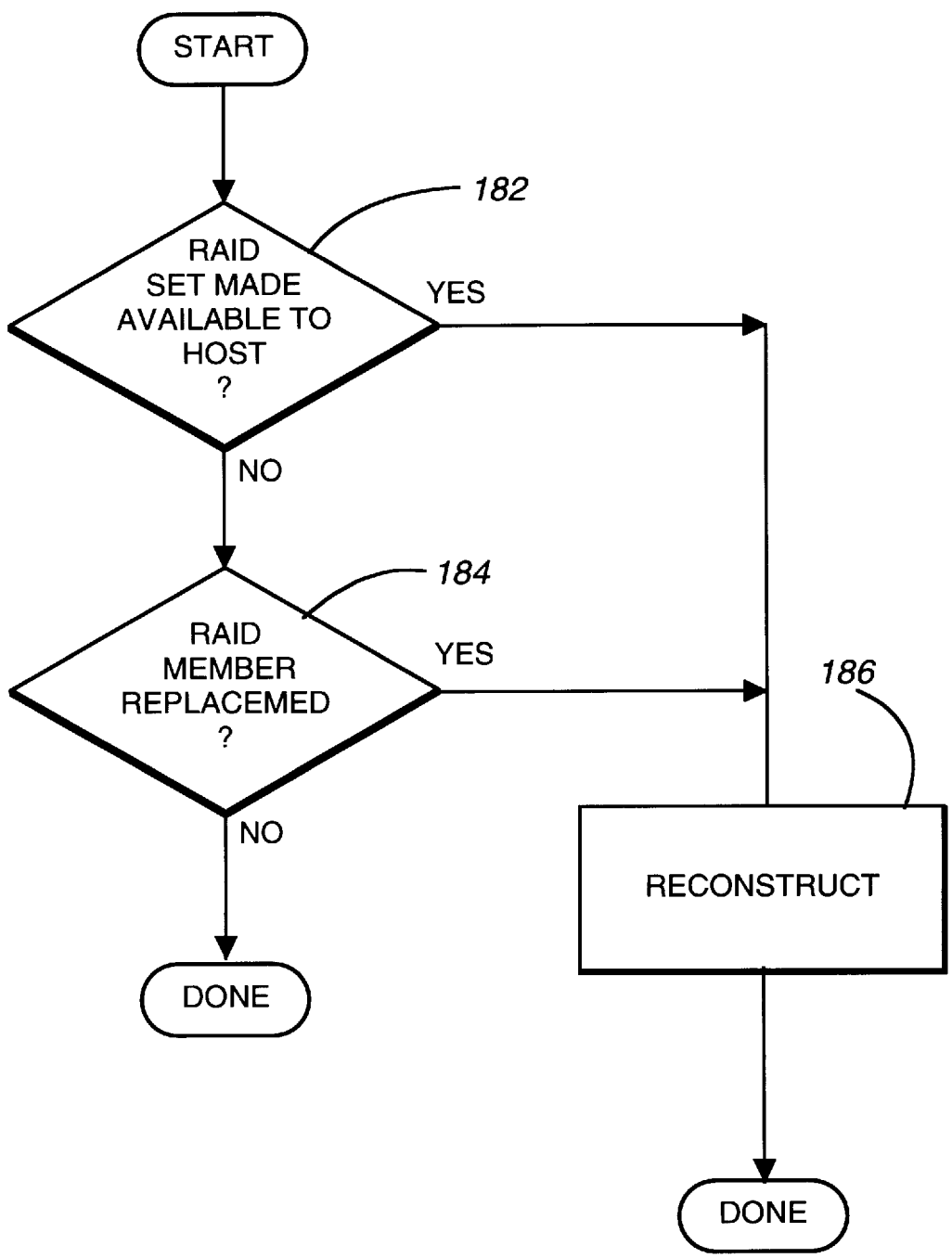
FIG. 4 shows the logical operations and conditions that trigger a reconstruct operation flow.

Reconstruct:

The device FE Bits are used to control a reconstruct process to reconstruct bad blocks in the RAIDed (RAID protected) space of the members of the RAIDset. Reconstruct is a background process that runs while reads/writes are run in the foreground by the controllers. As illustrated in FIG. 4, the reconstruct operations are initiated as the result of the detection of multiple conditions. Decision operation 182 will branch "Yes" to initiate the reconstruct operation 186 whenever the RAIDset is made available to a host cpu. This occurs when the controller is booted (i.e. after power is applied to the controller), when the RAIDset is initialized, or when the controller sees all the drives in the RAIDset (i.e. after power is applied to the member drives of the RAIDset after the controller is booted). If none of the above conditions are detected, decision operation 184 is monitoring for the RAID member replacement condition. When operation 184 detects that a member has been replaced, the process branches "Yes" to reconstruct process 186.

Figure 5:
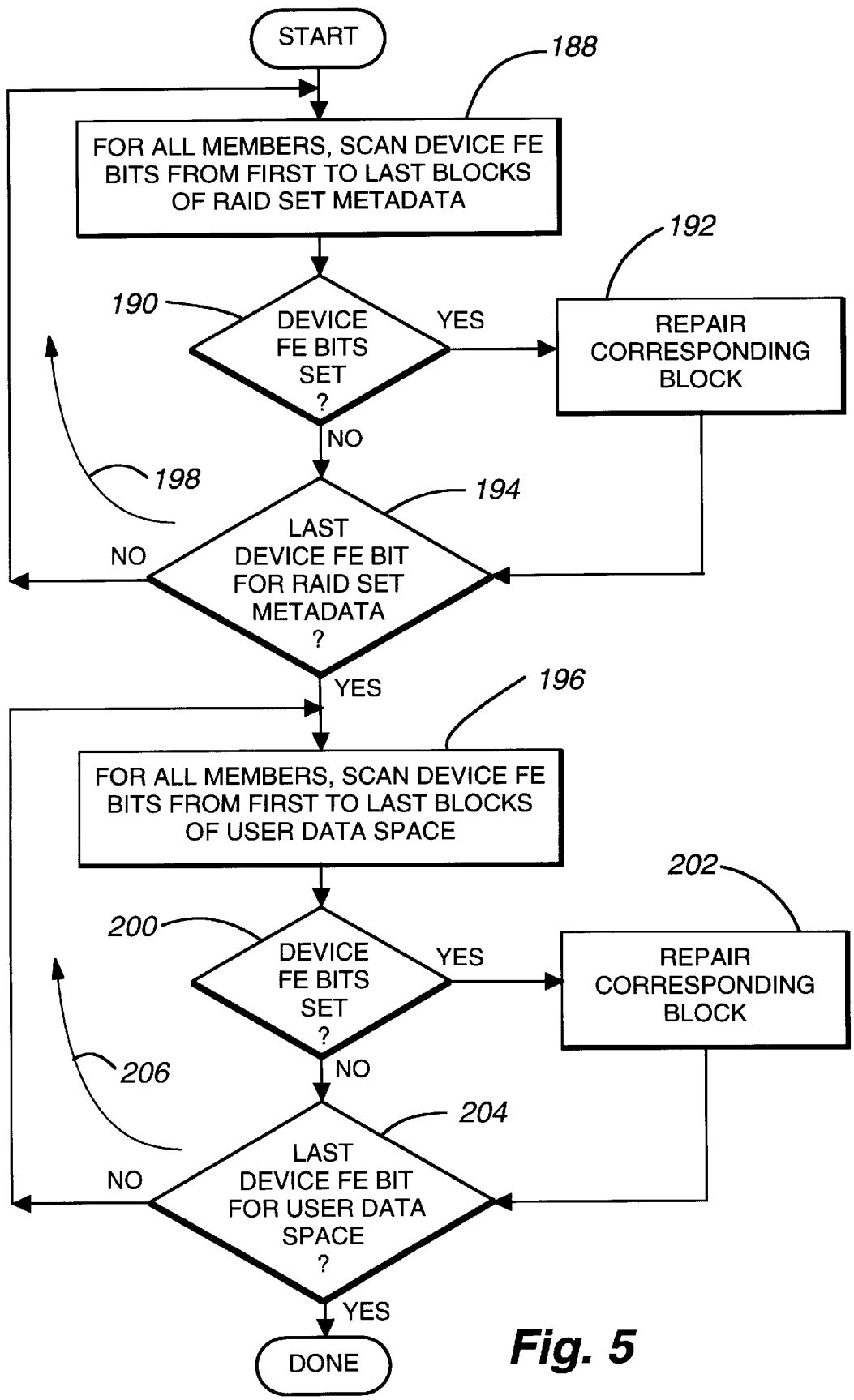
FIG. 5 shows the details of the reconstruct process in accordance with the preferred embodiment of this invention.

In FIG. 5, the reconstruct logical operations begin at step 188 which scans device FE bits across all members of the RAIDset. This scan operation is directed only to the device FE bits that correspond to blocks in the RAIDset metadata (FIG. 1). Also the scan starts at the first, device FE bit corresponding to the first block of RAIDset metadata and proceeds through the last, device FE bit corresponding to the last block of RAIDset metadata. During this scan, decision operation 190 detects each device FE Bit set condition, and the process branches to repair operation 192. Repair operation 192 (FIG. 6) repairs the corresponding block in the RAIDset metadata and returns to decision operation 194. If decision operation 190 does not detect a device FE bit set condition, the process also branches to decision operation 194.

Decision operation 194 is checking for the end of the scan through the device FE bits for the RAIDset metadata. When the last device FE bit for RAIDset metadata has been read, and if and when its corresponding data is block repaired, decision operation 194 branches the process "Yes" to operation 196 to scan device FE bits for the user data space.

If the decision operation 194 detects the device FE bit for the metadata space is not the last such device FE bit, the process branches "no" and returns to operation 188 to read the next device FE bit. In effect the reconstruct process stays in loop 198 until all of the RAIDset metadata blocks needing repair have been repaired. Loop 198 guarantees that RAIDset metadata is repaired before user data is repaired. This priority is given to repair of the RAIDset metadata as this metadata confirms the truth or trustworthiness of the user data.

Figure 6:
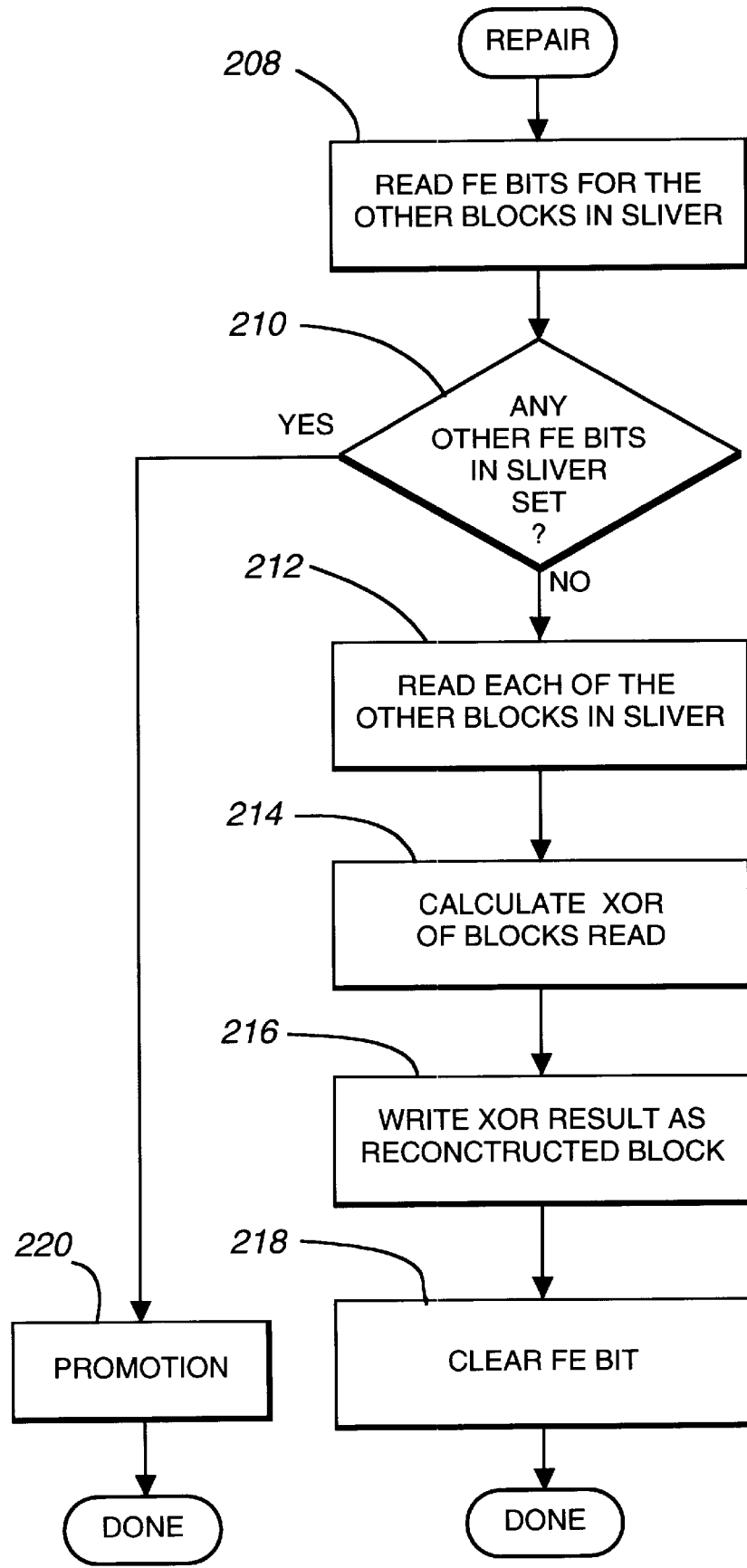
FIG. 6 shows the details of the repair process referred to in FIG. 5; the repair process regenerates data blocks identified as bad by device metadata.

Operation 196 also performs a scan of device FE bits for all members of the RAIDset. Operation 196 scans the device FE bits for the user data blocks including parity blocks for user data blocks. This scan is performed from first to last user data/parity block. When each device FE bit set condition is detected, decision operation 200 branches the process to repair operation 202 (FIG. 6). Repair operation 202 repairs the corresponding block in the user data space and returns to decision operation 204. If decision operation 200 does not detect a device FE bit set condition, the process branches "No" to decision operation 204.

Decision operation 204 is testing for the end of the scan through the device FE bits corresponding to blocks in user data space. When the last device FE bit for a block in user data space has been read, and if and when its block has been repaired, the reconstruct process is complete. If the decision operation 194 detects the device FE bit for the user data space is not the last such FE bit, the process branches "no" and returns to operation 196 to read the next device FE bit. In effect the reconstruct process stays in loop 206 until all of the user/parity data blocks needing repair have been repaired.

The repair process begins with operation 208 in FIG. 6. Operation 208 reads the device FE bits for the other blocks in the same sliver. This is done to detect whether any of the blocks whose data will be used to repair the bad block have been marked as inconsistent, i.e. unusable for RAID repair. Decision operation 210 tests for any other device FE bits set in the sliver and if none are detected, branches the repair process to operation 212. Operation 212 reads the data from each of the other blocks in the sliver, and operation 214 calculates the XOR (exclusive Or) of the blocks just read by operation 212. The result of the XOR calculation is the repaired or reconstructed block of data for the block corresponding to the device FE bit that was set to "1." Operation 216 writes the reconstructed block back to the storage device. After the block is reconstructed, step 218 clears the device FE bit (FIG. 6) to "0," and the repair process is complete.

If decision operation 210 detects that more than one block in the sliver has a device FE bit set, the repair process branches "Yes" to the promotion process 220. The promotion process restores consistency but can not reconstruct a block if more than one block in a sliver is marked as inconsistent. After promotion, the repair process is again complete.

Figure 7:
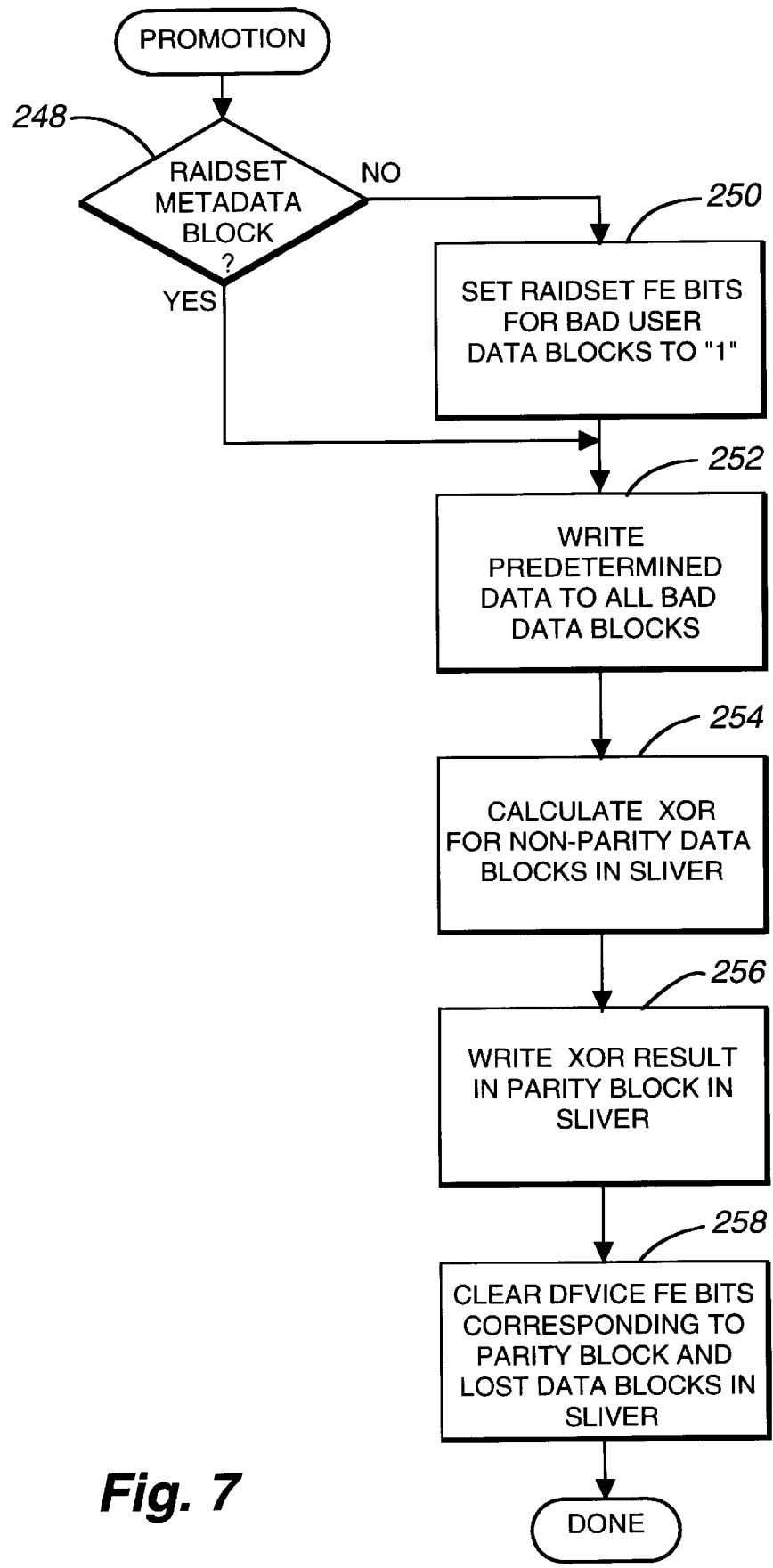
FIG. 7 shows the details of the promotion operation referred to in FIG. 6.

In FIG. 7 the promotion process starts at decision operation 248. Decision operation 221 tests whether the data blocks being regenerated are RAIDset metadata blocks or user data blocks. If the data blocks are user data blocks, the promotion process branches to operation 250 and then to operation 252. Operation 250 sets to "1" the RAIDset FE bit for each user data block identified as bad by the device FE bits. This will mark these blocks as untrustworthy. If the data blocks are RAIDset metadata blocks, the process branches directly to operation 252.

Operation 252 writes predetermined data to all bad data blocks. The predetermined data written to a bad data block depends on the type of data block as follows: user data block—all 0's, RAIDset FE Dir block—all 1's, RAIDset ID Block—duplicate ID (stored in RAIDset metadata), filler block (fill space in metadata space)—all 0's, RAIDset FE bit block if its FE Dir bit is 0—all 03 s, and RAIDset FE Bit block if its FE Dir bit is 1—all 1's.

Operation 254 calculates the XOR of all nonparity data blocks in the sliver to regenerate the parity block for the sliver. The regenerated parity block is written to the storage device by operation 256. Operation 256 writes the XOR result from operation 254 to the parity block location in the storage device or member containing the parity block for the sliver. Then operation 258 clears device FE bits corresponding to the parity block and the lost, data blocks in the sliver.

Now the sliver has been restored to consistency. The good user data or the good RAIDset metadata blocks may be reconstructed if they go bad thereafter. The lost user data blocks are usable to regenerate the good blocks in the sliver but have been flagged in the RAIDset metadata as containing untrustworthy data. If these lost user data blocks are sent to the host in a read operation, they will be marked with an error.

The reconstruct process has used both a "set FE Bit" process and a "clear FE Bit" process. Each of these processes also clear and set the corresponding FE Dir bit as appropriate.

Figure 8:
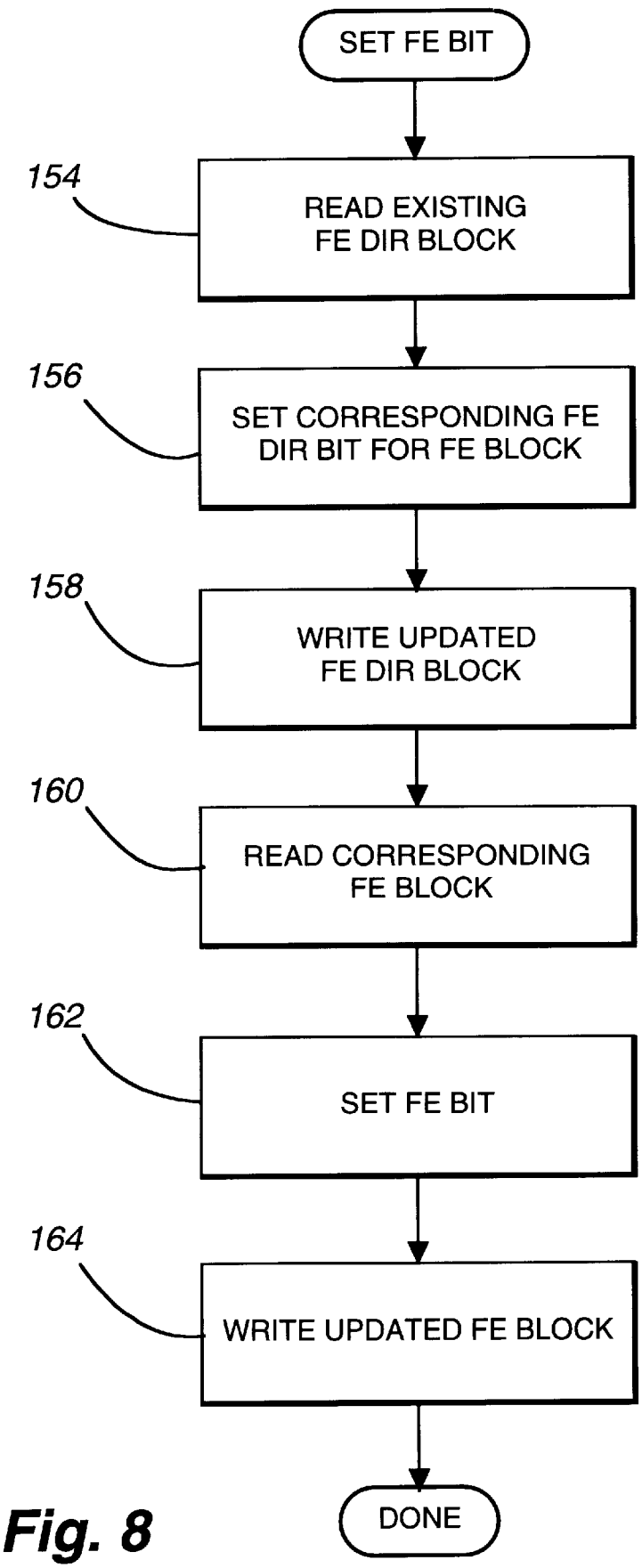
FIG. 8 shows the set FE Bit logical operation flow.

To set an FE bit to "1," the process in FIG. 8 begins with step 154 reading the existing FE Dir block containing the FE Dir bit corresponding to the FE bit block containing the FE bit that is being set. The FE Dir block is read from storage device to controller memory. After step 154 reads the FE Dir block into the controller memory space, operation 156 sets the FE Dir bit for the FE bit block to "1." Step 158 then writes the updated FE Dir block back to the storage device, i.e. disk drive.

The setting of an FE bit by first setting its corresponding FE Dir bit rather than first setting the FE Bit is a fail safe mode of operation. When checking for FE bits that have been set, the controller always checks the FE Dir bits first. This saves search time since an FE Dir bit represents a block of FE Bits. If the storage device were to go down between the setting of the FE Dir bit and the setting of the FE bit, the setting of the FE Dir bit would be a flag to the system that at least one of the FE bits in the corresponding FE block for the FE Dir bit may be set to "1."

Once the FE Dir bit has been set, step 160 reads the existing FE block from the storage device to controller memory space. Operation 162 then sets the FE bit in the FE block to "1." After the FE bit is set, operation 164 writes the updated FE block back to the storage device. This completes the "set FE bit" process.

Figure 9:
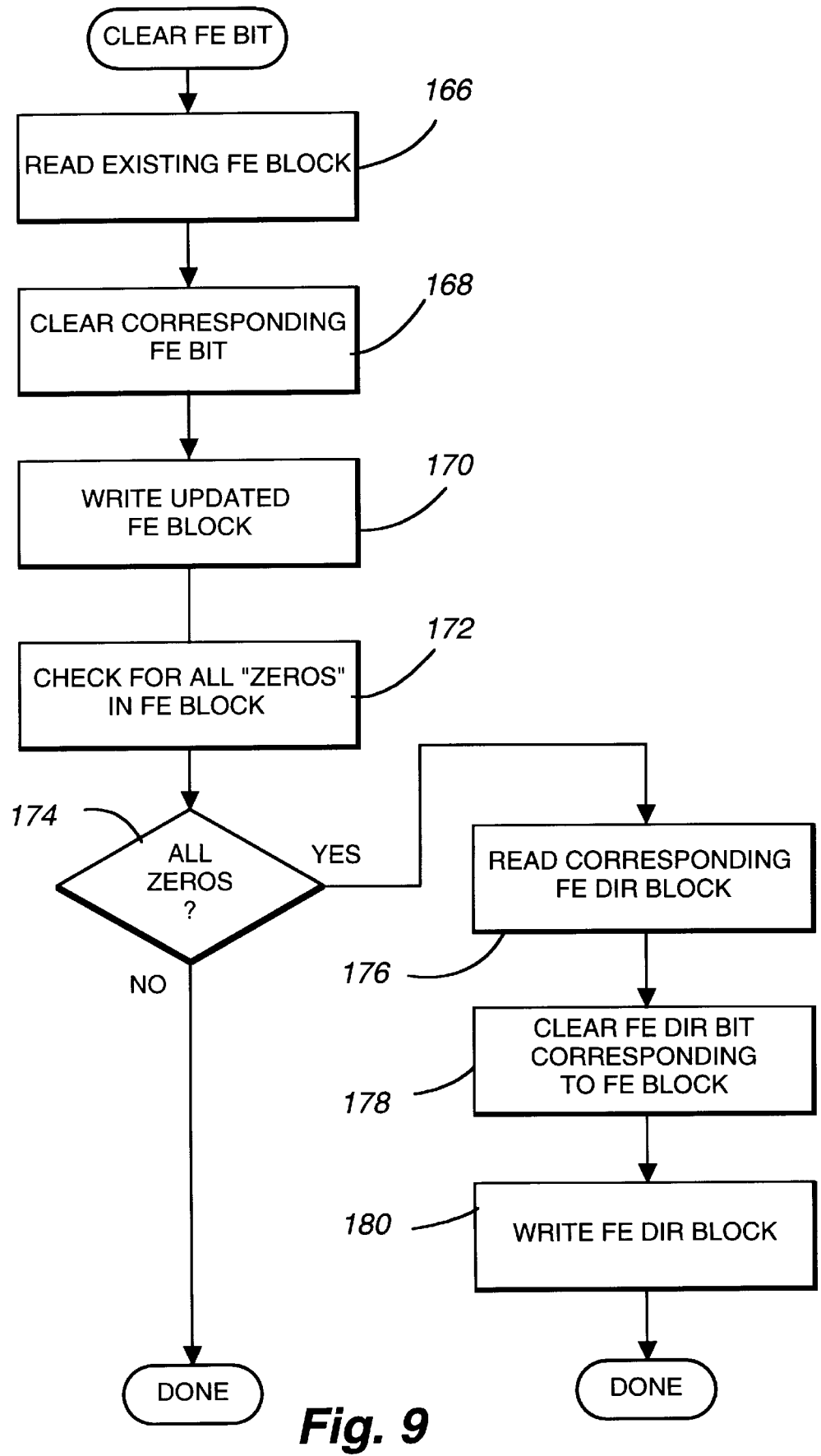
FIG. 9 shows the clear FE Bit logical operation flow.

To clear an FE bit to "0," the process in FIG. 9 begins with step 166 reading the existing FE block from the disk drive to the controller memory space. Operation 168 then clears the FE bit to "0" in memory space, and operation 170 writes the updated FE block back to the disk drive. Step 172 also reads the updated FE block from memory space to check if all the FE bits are "0." Decision operation 174 branches Yes, if the FE block is all clear, to operation 176. Step 176 reads the corresponding FE Dir block that contains the FE Dir bit for the FE block whose FE bit was changed. The FE Dir block is loaded into controller memory space, and step 178 clears the FE Dir bit for the FE block to "0." After the FE Dir bit is cleared, operation 180 writes the FE Dir block back to the disk drive.

In the "clear FE bit" operation the, FE bit is cleared first, and then the FE Dir bit is cleared. Again, this a fail safe mode operation in that the FE Dir bit is cleared last, because it is read first when the system is scanning for FE bits.

While the invention has been particularly shown and described with reference to preferred embodiments thereof, it will be understood by those skilled in the art that various other changes in the form and details may be made therein without departing from the spirit and scope of the invention.

We claim:

1. A method for reconstructing a data block in a RAID array, the RAID array having a plurality of data storage devices for storing user data blocks and metadata blocks, the metadata blocks including device metadata blocks associated with data blocks recorded on each storage device and RAIDset metadata blocks associated with RAID protected data blocks recorded across the storage devices of the RAID array, the RAID protected data blocks including the user data blocks and the RAIDset metadata blocks, said method comprising the steps of:

scanning forced error (FE) bits that each correspond to one of the RAIDset metadata blocks;

after scanning the FE bits that each correspond to one of the RAIDset metadata blocks, scanning other FE bits that each correspond to one of the user data blocks;

determining from each scanned FE bit whether a block corresponding to each scanned FE bit needs to be reconstructed; and reconstructing all RAIDset metadata blocks determined to need reconstructing before reconstructing any user data block that is determined to need reconstructing.

2. The method of claim 1, further comprising the steps of:

reading data from each other block in a RAID protected strip that has a particular block determined to need reconstructing; and regenerating a new data block from the data read from each other block.

3. The method of claim 2 further comprising the steps of:

writing the new data block in the RAID array as a reconstructed block in place of the particular block determined to need reconstructing; and clearing the FE bit corresponding to the particular block to indicate that the reconstructed block is consistent with the other blocks in the RAID protected strip that has the reconstructed block.

4. The method of claim 3 further comprising the steps of:

storing another FE bit that corresponds to the particular block in one of the RAIDset metadata blocks; and clearing the FE bit stored in one of the RAIDset metadata blocks to indicate that the reconstructed block contains valid data.

5. The method of claim 2 wherein said regenerating step comprises the step of:

bitwise exclusive ORing the bits of each other block in the RAID protected strip to produce the new data block.

6. The method of claim 2, further comprising the step of:

storing the FE bits that each correspond to one of the RAIDset metadata blocks in the device metadata blocks.

7. The method of claim 1 wherein the step of scanning FE bits that correspond to the RAIDset metadata blocks scans the FE bits corresponding to the RAIDset metadata blocks in sequence from a first RAIDset metadata block to a last RAIDset metadata block.

8. The method of claim 1 wherein the step of scanning FE bits that correspond to the user data blocks scans the FE bits corresponding to the user data blocks in sequence from a first user data block to a last user data block.

9. The method of claim 1 where each of the scanning steps comprises the step of:

scanning FE Dir bits corresponding to a block of FE bits to determine if any FE Bit in the block of FE bits indicates a block needs to be reconstructed.

10. A method for reconstructing a data block in a RAID protected strip in a RAID array comprising the steps of:

scanning forced error (FE) bits that each correspond to a block of RAIDset metadata;

determining from each scanned FE bit whether the corresponding block of RAIDset metadata needs to be repaired;

repairing each RAIDset metadata block determined to need repair until all RAIDset metadata blocks needing repair are repaired;

after repairing all RAIDset metadata blocks that need repair, scanning other FE bits that each correspond to a block of user data;

determining from each scanned other FE bit whether the corresponding block of user data needs to be repaired; and repairing each user data block determined to need repair.

* * * * *